Sept. 20, 1932.  R. W. REGENSBURGER  1,878,294
EGG SEPARATOR
Filed March 12, 1931

INVENTOR
BY
ATTORNEY

Patented Sept. 20, 1932

1,878,294

UNITED STATES PATENT OFFICE

RICHARD W. REGENSBURGER, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

EGG SEPARATOR

Application filed March 12, 1931. Serial No. 521,904.

My invention according to one aspect thereof relates to an egg separator which is an improvement on that described and claimed in application of Charles Taylor Walter and myself, filed October 25, 1930, Serial No. 491,132.

One of the objects of my present invention is to provide a novel, efficient and adjustable machine for separating the whites from the yolks of eggs.

Another object or aspect of my invention is to provide an egg separator device so designed as to minimize splashing of the egg whites and the consequent clouding by entrapment and incorporation of air bubbles.

With these objects in view, the invention consists in the novel construction and combination in arrangement of parts hereinafter described and claimed.

In the accompanying drawing illustrating said device, which drawing forms a part of this specification, similar characters of reference refer to similar parts in the several figures.

Figure 1:
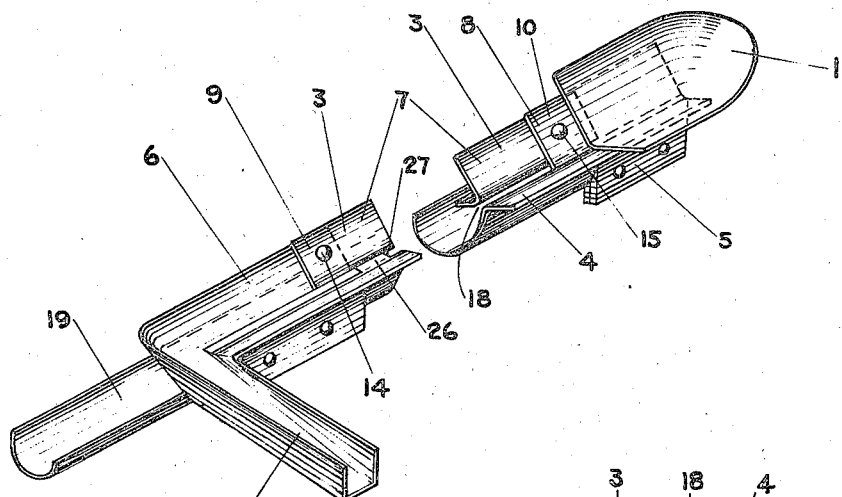
Figure 1 is a detail in perspective of the receiving and discharging ends of the slotted slides into which the eggs are placed after removal from the shell, showing the concealed parts in dotted lines.

The contents of an egg after removal from the shell are placed in receiver 1, from which it passes by gravity to slotted slide 2, which is formed from sides 3 and 4. It will be noted that side 3 is shown as an angle iron. Receiver 1 is mounted upon the slide 2 at the upper end. The lower wings of sides 3 and 4 being joined together for purposes of greater strength as at 5. It is to be noted that side 3 is comprised of three members, 6, 7 and 8, 6 being joined to 3 as at 9, 7 being lapped under 8 at 10, the union being effected by wing nuts 12 and 13 in combination with bolts 14 and 15. Bolt 14 passes through a hole of appropriate size in the upper wing of member 7 at the point indicated and through a slot 16 in member 6. A hole in member 8 accommodates bolt 15 at the point indicated, which bolt 15 passes through slot 17 in member 7. By loosening wing nuts 12 and 13, member 7 may be moved up or down through the length of slots 16 and 17, which increases or decreases the width of slot 18, as may be desired.

Eggs deposited in receiver 1, after removal from the shell, pass down the slide 2, permitting the white to fall away from the yolk through slot 18 to trough 19, attached to side 4. If desired, trough 19 may be integral with side 4, but it is sufficient for the purposes of my invention if the trough 19 is contiguous to side 4 or attached in close proximity thereto, and if attached, it will be preferable to have it closely attached. The yolk meat, encased in a natural membrane, slides down a slide 2 into discharge trough 20, and thence into receptacle 21. The whites slide down wall 22 of trough 19 and thence into receptacle 23.

Figure 4:
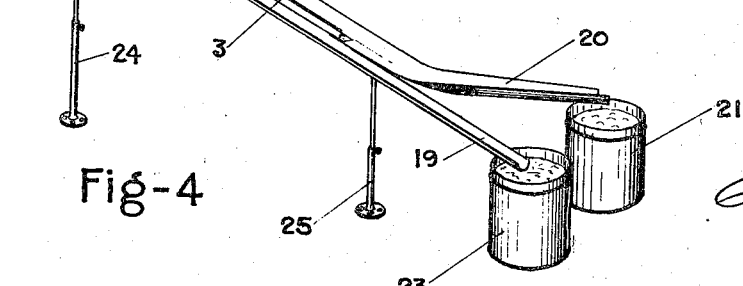
Figure 4 is a perspective view showing the slides set up in position for use.

In Figure 4, I have shown the device supported by supports 24 and 25. Other means of support may be used as desired. It will be seen that my present invention differs from the invention described in the co-pending application of Charles T. Walter and myself, filed October 25, 1930, Serial Number 491,132, in that the trough 19 has its wall 22 integral with or contiguous to side 4. The trough for the whites in my present invention is so disposed in relation to the slotted slide that egg whites passing through the opening in the slotted slide always remain in contact with the walls of the lower trough. It will be noted that the side wall 22 is inclined from the vertical sufficiently to cause the whites passing through the slotted slide to remain in contact with the side of the trough from the time they start through the slot until they leave the trough 19.

It will be noted that lap 26 is provided, and that trough 19 carries on beyond edge 27 of lap 26 and that side wall 22 of trough 19 carries on below edge 27 of lap 26, as I have found that often-times a considerable quantity of white adheres and is suspended from the yolk through slot 18, which is severed by edge 27 of lap 26.

As has been pointed out in said co-pending application, the adjustable feature of slot 18 permits adjustment to take care of differences in strength of yolk membrane. It has been found in practice that if egg whites are roughly handled or permitted to fall through space or splash, air bubbles are entrapped within the egg whites, giving the egg whites a milky or cloudy appearance. This is undesirable from the standpoint of appearance. It is further undesirable in that it is difficult to inspect whites for the presence of foreign material which impairs the leavening power in cake baking. The incorporated air bubbles tend to encourage spoilage by reason of the greater surface exposed to the presence of oxygen. My present invention avoids splashing and air incorporation in the egg whites by permitting them to slide rather than to fall or drop into the trough which is to convey them to the container, or, where desired, to a trap such as that described and claimed in my co-pending application for U. S. patent entitled Method and means for separating egg whites, Serial Number 512,402, filed January 30, 1931.

Figure 2:
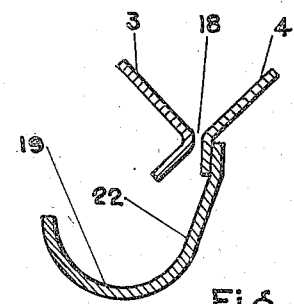
Figure 2 is a cross-sectional view through a slide.
Figure 3:
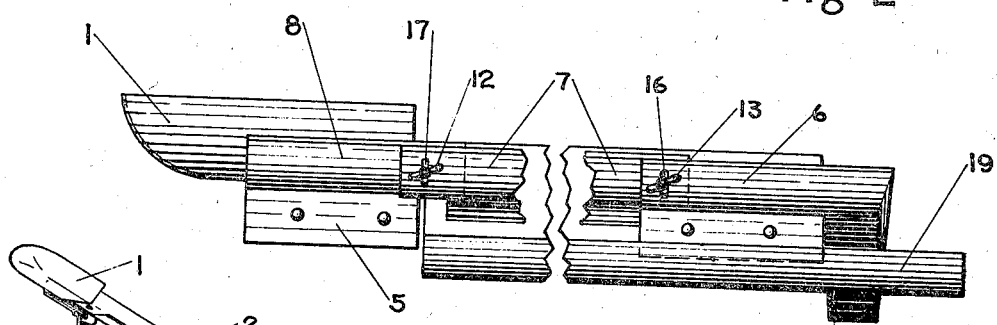
Figure 3 is a side view of Figure 1.

It will be noted that while the present device for separating the whites from the yolks of eggs has certain features common to prior devices for this class of work in that the present and prior devices each depends for its functioning upon an inclined longitudinally extending slotted slide or guide trough located above an inclined longitudinally extending white receiving trough, still according to one aspect of the invention the central portion of the white receiving trough is slightly offset, viz, is located at one side of the vertical lines passing downwardly through the central portion of the slotted section of the upper slide or guide trough, and in order to insure an easy, smooth and gradual movement of the whites from the slotted section to and into the white receiving trough, there is provided a longitudinally extending guide member, section or portion between the upper slotted section on the one hand and the white receiving trough proper on the other. In other words, this longitudinally extending guide member is located intermediate a side member defining an edge of the slot of the guide trough and the white receiving trough proper and is provided by the lower trough having one side 22 thereof which extends upwardly as shown in Fig. 2 to the lower portion of side member 4 of the upper trough. In transverse section this guide provided as by the part 22 extends sharply downwardly from the slotted section, thence less sharply and gradually and progressively transversely below the slotted section to the trough proper. The result of this structure and arrangement is such that the whites leaving the slotted portion are to a certain extent supported on and by the guide member and so as to have an easy, smooth and a gradual initial engagement with the guide followed by an increasing and progressive transverse movement while in engagement with the guide and until the whites are gently delivered in the trough proper.

It will be understood that changes may be made in the design of the slide as shown in the drawing and described herein without departing from the spirit of my invention as described in the following claims.

I claim:

1. A device for separating the whites from the yolks of eggs, consisting of a trough having a longitudinal slot placed above another trough, both of said troughs being inclined at an angle from the horizontal, said lower trough being integral with one wall of said upper trough, said lower trough having one side thereof extending upwardly to the lower portion of one of the side members of the trough and substantially crossing the vertical lines passing downwardly through the center of the slot.

2. A device for separating the whites from the yolks of eggs, consisting of a trough having a longitudinal slot place above another trough, both of said troughs being inclined by an angle from the horizontal, said lower trough being contiguous with one wall of said upper trough, the device having a longitudinally extending guide which in cross section inclines from the slotted portion of the upper trough and extends below and transversely of the slot of the upper trough to the lower trough whereby whites passing from the slot of the upper trough have a gradual and progressive change in transverse direction so as to insure gentle delivery of the whites into the lower trough.

3. In a device for separating the whites from the yolks of eggs, the combination of a trough having a longitudinal slot, adjustable as to width, disposes above a trough contiguous with said slotted trough but transversely offset with respect thereto, the device having a longitudinally extending guide portion which supports and transversely directs the white while passing from the slot to and into the trough below the slot.

4. A device for separating the whites from the yolks of eggs, comprising a slotted slide having one side formed from an angle iron at the upper end of which slotted slide is mounted an appropriate receiver, the sides of said slotted slide being adjustable in relation to each other to permit the increasing or decreasing the width of the slot, a trough disposed beneath said slotted slide to receive the egg whites sliding through said slot, which trough is transversely offset with respect to the slotted portion of said slide, said lower trough having a longitudinally extending guide member which is contiguous with one side of said slotted slide, which guide member in transverse section initially extends sharply downwardly and thereafter less sharply and progressively transversely below the slotted portion to the lower trough proper; appropriate means for mounting said slotted slide and said trough and means for conveying said separated yolks and whites to proper receptacles.

5. A device for separating the whites from the yolks of eggs, said device having a longitudinally extending downwardly inclined slotted slide or guide trough constructed so that the yolks will remain on the guide trough while sliding along the slotted portion thereof but so that the whites can leave the guide trough by passing downwardly through the slotted portion thereof, and a longitudinally extending downwardly inclined white receiving trough located below and relatively parallel with the slotted guide trough, the white receiving trough proper being transversely offset with respect to the slotted portion of the guide trough above it, the device also comprising a longitudinally extending guide member located intermediate a side member defining an edge of the slot of the guide trough on the one hand and the white receiving trough proper on the other, which guide member is arranged so that the whites passing from the slot have initial gradual and easy engagement with the guide member upon which they drop and downwardly slide and by which guide member they are subjected during their downward sliding movement to a gradual but progressive transverse movement until the whites are delivered into the trough section proper of the white receiving trough.

Signed at Chicago, Illinois, this 9th day of March, A. D. 1931.

RICHARD W. REGENSBURGER.